(12) United States Patent
Furukawa et al.

(10) Patent No.: US 12,314,967 B2
(45) Date of Patent: May 27, 2025

(54) FAMILIARITY DEGREE ESTIMATION APPARATUS, FAMILIARITY DEGREE ESTIMATION METHOD, AND RECORDING MEDIUM

(71) Applicant: NEC Corporation, Tokyo (JP)

(72) Inventors: Azusa Furukawa, Tokyo (JP); Kan Arai, Tokyo (JP); Kei Shibuya, Tokyo (JP); Hiroshi Hashimoto, Tokyo (JP); Ken Hanazawa, Tokyo (JP); Makiko Akiguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 223 days.

(21) Appl. No.: 17/801,639

(22) PCT Filed: Mar. 12, 2020

(86) PCT No.: PCT/JP2020/010737
§ 371 (c)(1),
(2) Date: Aug. 23, 2022

(87) PCT Pub. No.: WO2021/181597
PCT Pub. Date: Sep. 16, 2021

(65) Prior Publication Data
US 2023/0099665 A1    Mar. 30, 2023

(51) Int. Cl.
*G06Q 30/0201* (2023.01)
*G06V 20/52* (2022.01)
*G06V 40/16* (2022.01)

(52) U.S. Cl.
CPC ......... *G06Q 30/0201* (2013.01); *G06V 20/52* (2022.01); *G06V 40/174* (2022.01); *G06V 2201/07* (2022.01)

(58) Field of Classification Search
None
See application file for complete search history.

(56) References Cited

U.S. PATENT DOCUMENTS

| | | | |
|---|---|---|---|
| 11,354,728 B2 * | 6/2022 | Chachek | H04W 4/024 |
| 2007/0192872 A1 * | 8/2007 | Rhoads | H04W 99/00 707/E17.113 |

(Continued)

FOREIGN PATENT DOCUMENTS

| | | | |
|---|---|---|---|
| JP | 2015-141572 A | 8/2015 | |
| JP | 2017-091210 A | 5/2017 | |

(Continued)

OTHER PUBLICATIONS

Li Yusheng et al., User Familiar Degree-Aware Recommender System, 2015 IEEE International Conference on Web Services, IEEE computer society (Year: 2015).*

(Continued)

*Primary Examiner* — Jerry O'Connor
*Assistant Examiner* — Matthew H Divelbiss

(57) ABSTRACT

In a familiarity degree estimation apparatus, a first video process unit calculates a time while a hand being viewed, which is a time when a customer is viewing the hand. A second video process unit calculates a time while an item being held, which is a time when the customer is holding an item. A familiarity degree estimation unit calculates a time while the item being viewed based on the time while a hand being viewed and the time while the item being held, and estimates that the longer the time while the item being viewed, the lower the degree of familiarity of the customer with respect to the item.

9 Claims, 8 Drawing Sheets

(56) References Cited

U.S. PATENT DOCUMENTS

| | | | | |
|---|---|---|---|---|
| 2007/0194918 A1* | 8/2007 | Rabinowitz | ........ | G08B 13/1961 |
| | | | | 340/568.2 |
| 2015/0213498 A1 | 7/2015 | Ito | | |
| 2022/0414732 A1* | 12/2022 | Ellison | ............... | G06Q 30/0621 |

FOREIGN PATENT DOCUMENTS

| | | | | |
|---|---|---|---|---|
| JP | 2017-102564 A | 6/2017 | | |
| JP | 2017-102573 A | 6/2017 | | |
| JP | 2017-102574 A | 6/2017 | | |
| WO | WO-2014004864 A1 * | 1/2014 | ......... | G06K 9/00677 |

OTHER PUBLICATIONS

International Search Report for PCT Application No. PCT/JP2020/010737, mailed on Jul. 28, 2020.

* cited by examiner

| ITEM BEING HELD | TIME WHILE ITEM IS BEING VIEWED (TOTAL) | DEGREE OF FAMILIARITY |
|---|---|---|
| A | 5 SECONDS | 1/(5+1) |
| B | 1 SECOND | 1/(1+1) |
| C | 0 SECONDS | 1/(0+1) |
| . | . | . |
| . | . | . |

FIG. 7

<CLASSIFICATION OF FAMILIARITY OF CUSTOMERS>

| ITEM | DEGREES OF FAMILIARITY (AVERAGE VALUE OF CUSTOMERS FOR EACH OF GROUPS) | | | |
|---|---|---|---|---|
| | ADULT (MALE) | ADULT (FEMALE) | CHILD (MALE) | CHILE (FEMALE) |
| A | 0.2 | 0.7 | 0.4 | 0.5 |
| B | 0.3 | 0.4 | 0.7 | 0.8 |
| C | 0.7 | 0.8 | 0.2 | 0.3 |
| · | · | · | × | · |
| · | · | · | × | · |

FIG. 8

<CLASSIFICATION BASED ON WHETHER PURCHASED OR NOT>

| ITEM | DEGREES OF FAMILIARITY (AVERAGE VALUE OF CUSTOMERS) | |
|---|---|---|
| | PURCHASED | NOT PURCHASED |
| A | 0.7 | 0.3 |
| B | 0.8 | 0.4 |
| C | 0.6 | 0.2 |
| * | * | * |
| * | * | * |

FIG. 9

| | PURCHASED | NOT PURCHASED |
|---|---|---|
| DEGREE OF FAMILIARITY: HIGH | NO PROBLEM | GOOD APPEARANCE AND PRODUCT CONCEPT, BUT LOW NAME RECOGNITION |
| DEGREE OF FAMILIARITY: LOW | GOOD APPEARANCE AND PRODUCT CONCEPT, BUT LOW NAME RECOGNITION | PROBLEM WITH NAME RECOGNITION, APPEARANCE, AND PRODUCT CONCEPT (OR NOT SUITABLE TO CUSTOMER) |

FAMILIARITY DEGREE ESTIMATION APPARATUS, FAMILIARITY DEGREE ESTIMATION METHOD, AND RECORDING MEDIUM

This application is a National Stage Entry of PCT/JP2020/010737 filed on Mar. 12, 2020, the contents of all of which are incorporated herein by reference, in their entirety.

TECHNICAL FIELD

The present disclosure relates to a technique for estimating a degree of familiarity of a customer with respect to a product.

BACKGROUND ART

A method for detecting and analyzing movements of human eyes using images taken by a camera has been proposed. For example, Patent Document 1 describes detecting a movement of a line of sight of a user looking at a menu at a restaurant or the like, and calculating a gazing time that represents a degree of attention by the user with respect to an item.

PRECEDING TECHNICAL REFERENCES

Patent Document
  Patent Document 1: Japanese Laid-open Patent Publication No. 2017-091210

SUMMARY

Problem to be Solved by the Invention

A technique of Patent Document 1 calculates a time while a user is being looking at an item based on a direction of a face and a direction of a line of sight of the user: however, it is difficult to accurately detect which item among a large number of items actually displayed in a menu is viewed by the user based on only the direction of the face and the direction of the line of sight.

It is one object of the present disclosure to provide a method for estimating respective degrees of familiarity of a customer with respect to individual items based on a behavior for each of customers in a store or the like.

Means for Solving the Problem

According to an example aspect of the present disclosure, there is provided a familiarity degree estimation apparatus including:
  a first video process unit configured to calculate a time while a hand is being viewed when a customer is viewing the hand, based on a video including a face of the customer;
  a second video process unit configured to calculate a time while an item is being held when the customer is holding the item, based on a video including the hand of the customer; and
  a familiarity degree estimation unit configured to estimate a degree of familiarity of the customer with respect to the item based on the time while the hand is being viewed and the time while the item is being held.

According to another example aspect of the present disclosure, there is provided a familiarity degree estimation method, including:
  calculating a time while a hand is being viewed when a customer is viewing the hand, based on a video including a face of the customer;
  calculating a time while an item is being held when the customer is holding the item, based on a video including the hand of the customer; and
  estimating a degree of familiarity of the customer with respect to the item based on the time while the hand is being viewed and the time while the item is being held.

According to a further example aspect of the present disclosure, there is provided a recording medium storing a program, the program causing a computer to perform a process including:
  calculating a time while a hand is being viewed when a customer is viewing the hand, based on a video including a face of the customer;
  calculating a time while an item is being held when the customer is holding the item, based on a video including the hand of the customer; and
  estimating a degree of familiarity of the customer with respect to the item based on the time while the hand is being viewed and the time while the item is being held.

Effect of the Invention

According to the present disclosure, it is possible to estimate respective degrees of familiarity of a customer with respect to individual items based on a behavior for each of customers in a store or the like.

BRIEF DESCRIPTION OF THE DRAWINGS

FIG. 7 illustrates an example of classifying the degree of familiarity for each of items based on attributes of customers.

FIG. 8 illustrates an example of classifying the degree of familiarity for each of the items based on whether or not the customers purchased the items.

FIG. 9 illustrates an analysis example based on the degree of familiarity and information whether or not the item is purchased.

EXAMPLE EMBODIMENTS

In the following, example embodiments will be described with reference to the accompanying drawings.

First Example Embodiment

[Overall Configuration]

Figure 1:
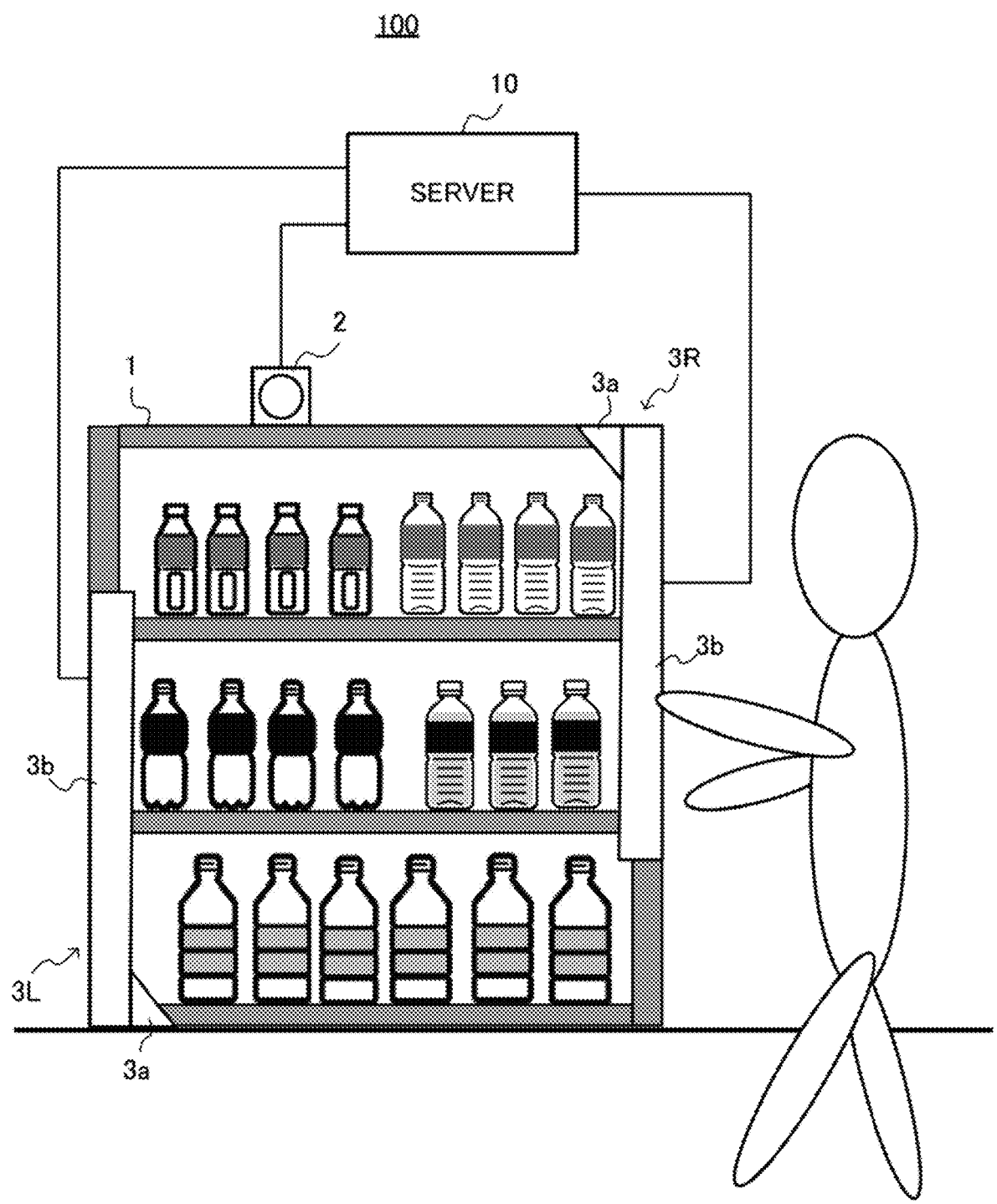
FIG. 1 illustrates a schematical configuration of a familiarity degree estimation apparatus according to a first example embodiment.

FIG. 1 illustrates a schematic configuration of a familiarity degree estimation apparatus according to a first example embodiment. The familiarity degree estimation apparatus 100 is installed in a store or the like in order to estimate a degree of familiarity of a customer with respect to items displayed on an item shelf 1. The familiarity degree estimation apparatus 100 includes a camera 2 for a line of sight, cameras 3R and 3L for items, and a server 10. The camera 2 for the line of sight and the cameras 3R and 3L for the items communicate with the server 10 by wired or wireless communications.

The camera 2 for the line of sight is installed on an upper portion of the item shelf 1. The camera 2 for the line of sight is used to take a video of a customer in front of the item shelf 1, and to capture a portion including at least a face of the customer. The camera 2 for the line of sight sends the video in which the customer is taken to the server 10. Note that a "video" refers to a live stream.

The cameras 3R and 3L for the items are provided to take videos in a state in which the customer picks up an item and puts back the item on the item shelf 1, and sends the videos, in which the customer picks up the item and puts back the item on the item shelf 1, to the server 10. In this example embodiment, a pair of the cameras 3R and 3L for the items is attached to a frame of the item shelf 1. Each of the cameras 3R and 3L includes a camera unit 3a and an illumination unit 3b. In the camera 3R for the items which is placed to a right side of the item shelf 1, while the illumination unit 3b is illuminating a front and a front region of the item shelf 1, the camera unit 3a provided at an upper right corner of the item shelf 1 takes a video of the entire front and the front region of the item shelf 1 at a lower left direction. Similarly, by the camera 3L for the items which is placed to a left side of the item shelf 1, in a state where the illumination unit 3b is illuminating the front and front regions of the item shelf 1, the camera unit 3a provided at a lower left corner of the item shelf 1 takes a video of the entire front and the front region of the item shelf 1 in an upper right direction. Since the cameras 3R and 3L at a right corner and a left corner are used to capture a hand of the customer who picks up an item and puts back the item, from both the right side and the left side, even in a case where the item is hidden by the hand of the customer in the video taken by either one of the cameras of the left side and the right side, the item in the hand of the customer can be captured in the video by another camera.

[Server Hardware Configuration]

Figure 2:
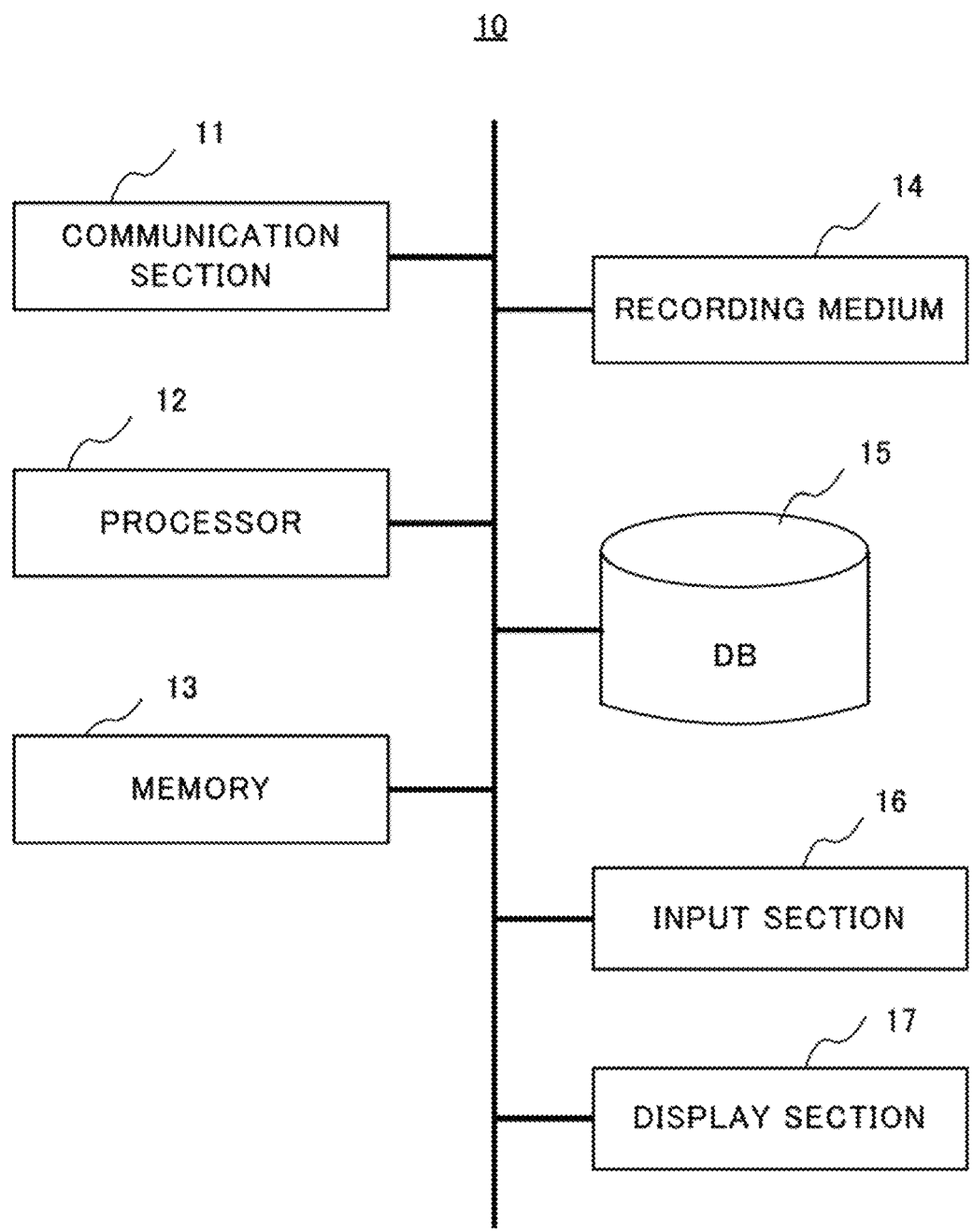
FIG. 2 is block diagram illustrating a hardware configuration of a server.

FIG. 2 is a block diagram illustrating a hardware configuration of a server 10. As illustrated, the server 10 includes a communication section 11, a processor 12, a memory 13, a recording medium 14, a database (DB) 15, an input section 16, and a display section 17.

The communication section 11 communicates with the camera 2 for the line of sight and the cameras 3R and 3L for the items by a wired or wireless means. The processor 12 is a computer such as a CPU (Central Processing Unit) and controls the entire server 10 by executing a program prepared in advance. In detail, the processor 12 executes a familiarity degree estimation process which will be described later.

The memory 13 is formed by a ROM (Read Only Memory), a RAM (Random Access Memory), or the like. The memory 13 is also used as a working memory during the execution of various processes by the processor 12.

The recording medium 14 is a non-volatile and non-transitory recording medium such as a disk-shaped recording medium, a semiconductor memory, or the like, and is formed to be detachable from the server 10. The recording medium 14 records various programs executed by the processor 12. When the server 10 executes various kinds of processes, programs recorded on the recording medium 14 are loaded into the memory 13 and executed by the processor 12.

The database 15 stores the video transmitted from the camera 2 for the line of sight and the cameras 3R and 3L for the items. Moreover, the database 15 stores each video of each item to be subjected to a familiarity degree estimation, various types of pieces of information generated in the familiarity degree estimation process, an estimation result of the degree of familiarity, and the like. The input section 16 is a keyboard, a mouse, or the like for a user to perform instructions and inputs. The display section 17 is a liquid crystal display or the like, and displays the estimation result of the degree of familiarity, statistics of the degree of familiarity, or the like.

[Functional Configuration of Server]

Figure 3:
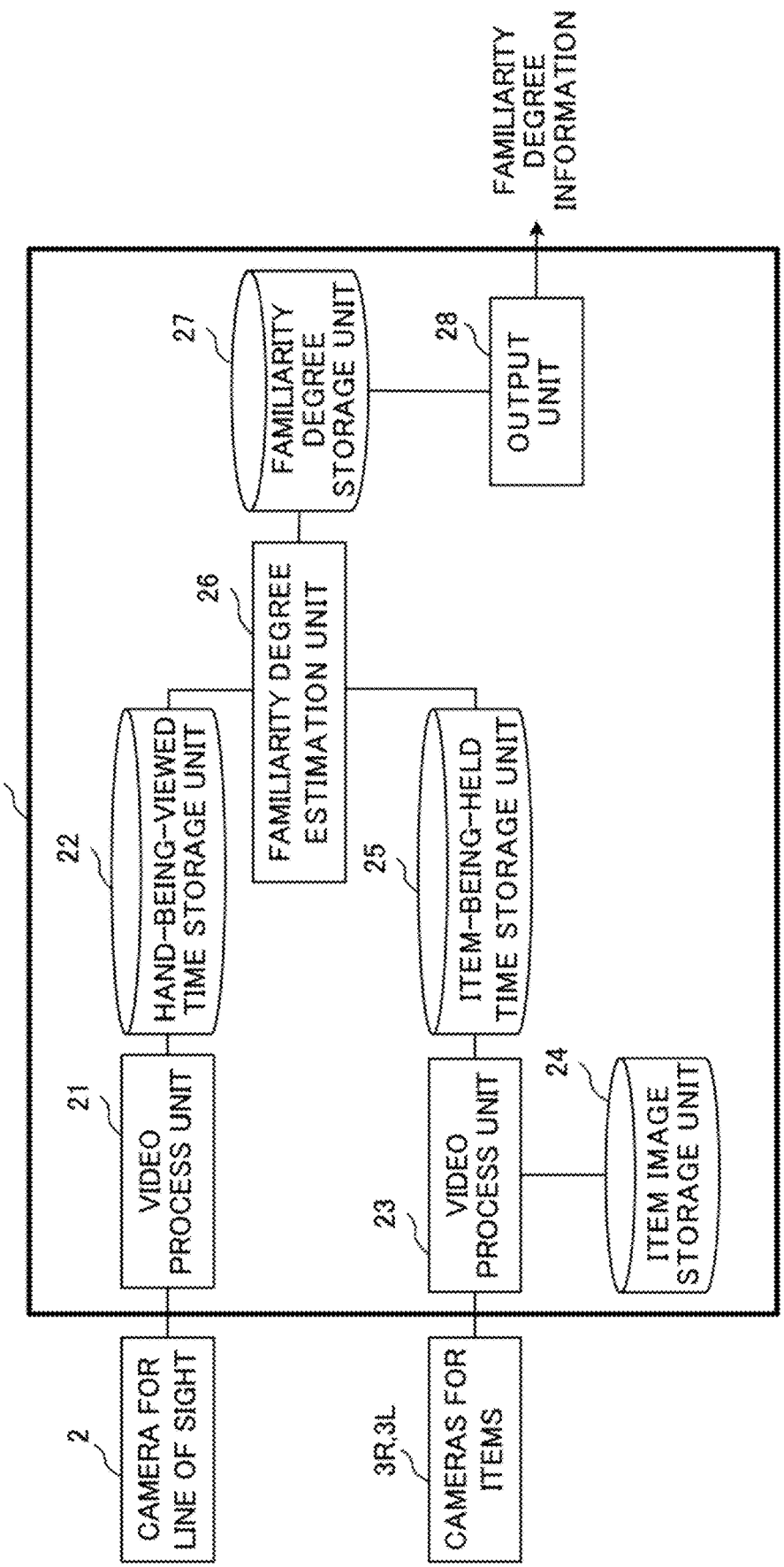
FIG. 3 is a block diagram illustrating a functional configuration of the server.

FIG. 3 is a block diagram illustrating a functional configuration of the server 10. The server 10 functionally includes a video process unit 21, a hand-being-viewed time storage unit 22, a video process unit 23, an item image storage unit 24, an item-being-held time storage unit 25, a familiarity degree estimation unit 26, a familiarity degree storage unit 27, and an output unit 28.

The image processing unit 21 acquires a video including a face of a customer in front of the item shelf 1 from the camera 2 for the line of the sight and detects a direction of the line of sight of the customer. In particular, the image processing unit 21 detects whether or not the line of sight of the customer is directed in a direction of a hand of the customer, measures a time while the customer is viewing a hand of the customer (hereinafter, referred to as a "time while the hand is being viewed"), and records the measured time in the hand-being-viewed time storage unit 22.

The video process unit 23 acquires, from the cameras 3R and 3L for the items, each video (hereinafter, also referred to as a "pick-up and put-back videos") which captures a state in which the item is picked up from and put back to the item shelf 1. The video process unit 23 compares each of the pick-up and put-back videos acquired from the cameras 3R and 3L for the items with each of images of the items stored in the item image storage unit 24, and recognizes the item which the customer holds in a hand of the customer. Moreover, the video process unit 23 measures a time (hereinafter, referred to as a "time while the item is being held") at which the customer holds the item in the hand, and records the time in the item-being-held time storage unit 25 in association with the item identification information such as an item ID.

The familiarity degree estimation unit 26 estimates the degree of familiarity of the customer with respect to that item by using the time while the hand is being viewed stored in the hand-being-viewed time storage unit 22 and the time while the item is being held for each item stored in the item-being-held time storage unit 25, and stores a result of the estimation for each of the items in the familiarity degree storage unit 27. Accordingly, in the familiarity degree storage unit 27, with respect to each of the items, the estimated degree of familiarity is stored for each of individual customers. After that, the familiarity degree estimation unit 26 calculates a degree of familiarity of the customers as a whole by calculating an average value or the like of degrees of familiarity at a time when the degrees of familiarity are obtained for a certain number of customers, and stores the calculated degree of familiarity in the familiarity degree storage unit 27. The output unit 28 outputs the degree of familiarity for each item stored in the familiarity degree storage unit 27 as the familiarity degree information to the external apparatus in accordance with an instruction of the user or the like.

[Estimation of Degree of Familiarity]

Next, the estimation of the degree of familiarity performed by the familiarity degree estimation unit 26 will be described in detail. The degree of familiarity for each item is known as one of item evaluation data. As the item evaluation data, the degree of familiarity is regarded as useful data that can be used for each item display in a store and a product development and a marketing strategy for a company. As the item evaluation data, as well as purchase information indicating who purchased an item when, where, and what, not-purchased information ("clicked but not purchased", "put in a cart but not purchased", or the like) in an EC (Electronic Commerce), inquiry data in which the item is evaluated, and the like, the degree of familiarity for the item may be used. The degree of familiarity is important as information for determining an appropriate marketing method (to whom and how to sell the item).

(Estimation Method)

In the present example embodiment, the familiarity degree estimation unit 26 estimates a degree of the familiarity of a customer with respect to an item based on a time when the customer picks up the item and is looking at the item. As the basic idea, it is considered that the customer who is not familiar with an item, that is, has a low degree of familiarity of the item will pick up the item and observe the item closely. Accordingly, it is presumed that the longer the item is picked up and viewed, the lower the degree of familiarity of the item. Therefore, in the present example embodiment, the video process unit 21 measures a time at which the customer holds a certain item in a hand of the customer as the time while the item is being held, and the video process unit 23 measures the time at which the customer is viewing the hand of the customer as the time while the hand is being viewed. After that, the familiarity degree estimation unit 26 calculates a time (hereinafter, referred to as a "time while the item is being viewed") at which the customer is viewing the item using the time while the item is being held and the time while the hand is being viewed, and estimates the degree of familiarity of the customer with respect to that item based on the time while the item is being viewed.

Figures 4, 5:
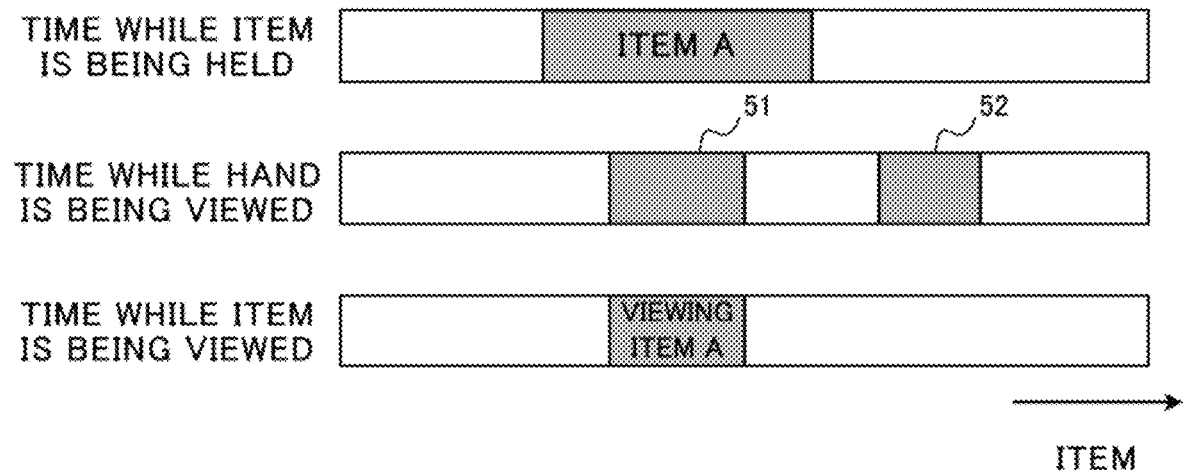
FIG. 4 illustrates an example of calculating a time while an item is being viewed based on a time while the item is being held and a time while a hand is being viewed.
FIG. 5 illustrates an example of calculating a degree of familiarity based on a time while the item is being viewed.

FIG. 4 illustrates an example of calculating the time while the item is being viewed based on the time while the item is being held and the time while the hand is being viewed. The time while the item is being held is measured by the video process unit 21 and is regarded as a time when a customer holds a certain item A in a hand of the customer. The time while the item is being held corresponds to a time for a customer to pick up the item A from the item shelf 1, to observe the item A by holding the item A in the hand of the customer, and put the item A in a shopping cart or the like. The time while the hand is being viewed is regarded as a time when the customer is simply seeing the hand of the customer, and what is actually seeing depends on what the customer has in the hand. Accordingly, not only a time when the customer views an item which the customer is holding in the hand of the customer but also a time when the customer views a purse or a smartphone held in the hand of the customer is similarly measured as a time when the customer views the hand. In an example illustrated in FIG. 4, in reality, a time 51 while the hand is being viewed corresponds to a time when the customer is viewing the item, while a time 52 while the hand is being viewed corresponds to a time when the customer is viewing something other than the items. Accordingly, as illustrated in FIG. 4, the familiarity degree estimation unit 26 detects a time zone in which the time while the item is being held and the time while the hand is being viewed overlap with each other, as the time while the item is being viewed.

After that, the familiarity degree estimation unit 26 estimates the degree of familiarity based on the time while the item is being viewed. At this time, the familiarity degree estimation unit 26 estimates that the longer the time while the item is being viewed, the lower the degree of familiarity, and that the shorter the time while the item is being viewed, the higher the degree of familiarity. FIG. 5 illustrates an example of calculating the degree of familiarity based on the time while the item is being viewed. In this example, the familiarity degree estimation unit 26 calculates a reciprocal of the time while the item is being viewed as the degree of familiarity, as illustrated in the following equation.

$$\text{(degree of familiarity)} = 1/(\text{time while the item is being viewed} + 1)$$

Note that since the reciprocal cannot be calculated when the time while the item is being viewed is "0 seconds", for convenience, the reciprocal of a value obtained by adding 1 to the time while the item is being viewed is calculated as the degree of familiarity.

As described above, in the present example embodiment, the time while the item is being viewed, which is the time that the customer is viewing the item in the hand, is detected, and the degree of familiarity is calculated based on the detected time while the item is being viewed. Therefore, after correctly specifying the item as a target, it is possible to estimate the degree of familiarity of the customer with respect to the item.

(Familiarity Degree Estimation Process)

Figure 6:
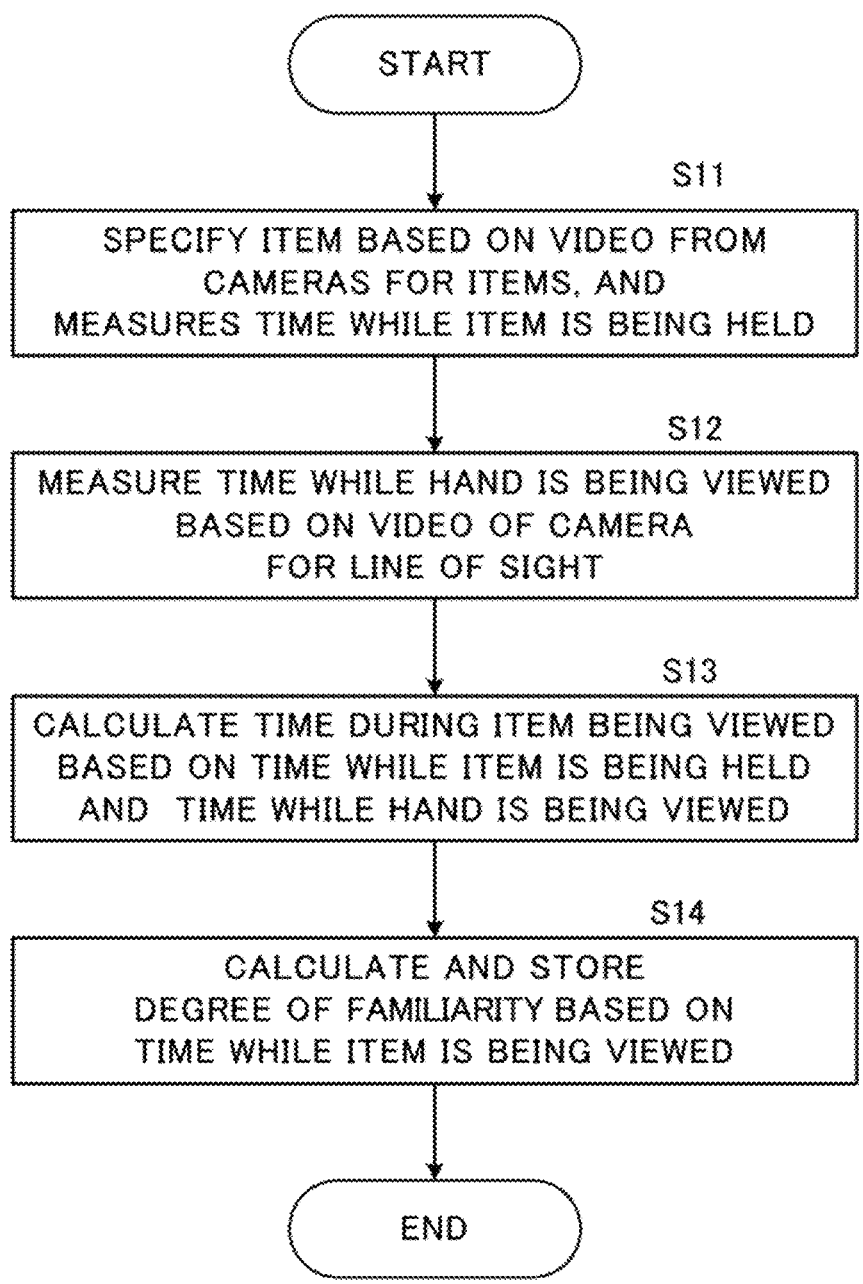
FIG. 6 is a flowchart of a familiarity degree estimation process.

FIG. 6 is a flowchart of the familiarity degree estimation process. This process is accomplished by the processor 12 illustrated in FIG. 2, which executes a program prepared in advance and operates as each element illustrated in FIG. 3. Note that this process is triggered by the camera 2 for the line of sight detecting the customer and the cameras 3R and 3L recognizing the item.

First, the video process unit 23 specifies an item from a video acquired by the cameras 3R and 3L for the items and also measures the time while the item is being held (step S11). Moreover, the video process unit 21 measures the time while the hand is being viewed based on the video acquired by the camera 2 for the line of sight (step S12). An order of steps S11 and S12 may be reversed, or steps S11 and S12 may be performed at the same time.

Next, the familiarity degree estimation unit 26 calculates the time while the item is being viewed based on the time while the item is being held and the time while the hand is being viewed (step S13). Next, the familiarity degree estimation unit 26 calculates the degree of familiarity based on the time while the item is being viewed, and stores the degree of familiarity in the familiarity degree storage unit 27 (step S14). After that, the familiarity degree estimation process is terminated.

[Modifications]

Next, modifications of the present example embodiment will be described. The following modifications can be applied in combination as appropriate.

(Modification 1)

The degree of familiarity obtained in the above-described example embodiment may be classified and stored for each attribute of a customer. The camera 2 for a line of sight takes a video that includes a face of the customer, while each of the camera 3R and 3L for the items takes a video that includes the entire body or at least an upper body of the customer. Therefore, by using at least one of the video process units 21 and 23, it is possible to determine a height, a gender, and the like of the customer to some extent, and it is possible to classify the customer by attributes such as the gender, an adult, and a child. FIG. 7 illustrates an example of classifying the degree of familiarity obtained by the attributes of the customer. In this example, the degree of familiarity with respect to each of the items is classified into one of four groups: an adult (male), an adult (female), a child (male), and a child (female) in accordance with a combination of the gender attribute and the adult/child attribute. Note that, the degree of familiarity exemplified in FIG. 7 is an average value of the degrees of familiarity of a plurality of customers belonging to each of the groups. Accordingly, in a case where the obtained degree of familiarity is classified and recorded based on the attributes of the customer, it is possible to acquire more useful information in marketing or the like.

(Modification 2)

The degree of familiarity obtained in the above-described example embodiment may be stored in combination with information on whether or not the customer actually purchased the item. FIG. 8 illustrates an example of classifying the degree of familiarity of each item based on the information on whether or not the customer actually purchased the item. Degrees of familiarity illustrated in FIG. 8 indicate an average value of the degrees of familiarity of a plurality of respective customers who purchased each of the items, and an average value of the degrees of familiarity of a plurality of respective customers who did not purchase each of the items. Accordingly, these degrees of familiarity are useful in the marketing or the like to analyze a relationship between the degrees of familiarity and purchases of the items. FIG. 9 illustrates an example of an analysis based on the degree of familiarity of each item and information on whether or not the item was purchased. In this example, the analysis is conducted in a viewpoint of appearances of the items, item concepts, and name recognitions, based on the degrees of familiarity and the information on whether or not the customers actually purchased each of the items.

The information of whether or not each of the customers actually purchased the item may be acquired based on POS (Point Of Sales) data or the like of the store, or the video process unit 23 may analyze and generate the videos acquired from the cameras 3R and 3L for the items. In detail, based on the video from the cameras 3R and 3L for the items, it may be determined that the customer purchased an item when the item picked up from the item shelf 1 was put into a shopping cart, and that the item was not purchased when the customer returned the item on the item shelf 1.

Second Example Embodiment

Figure 10:
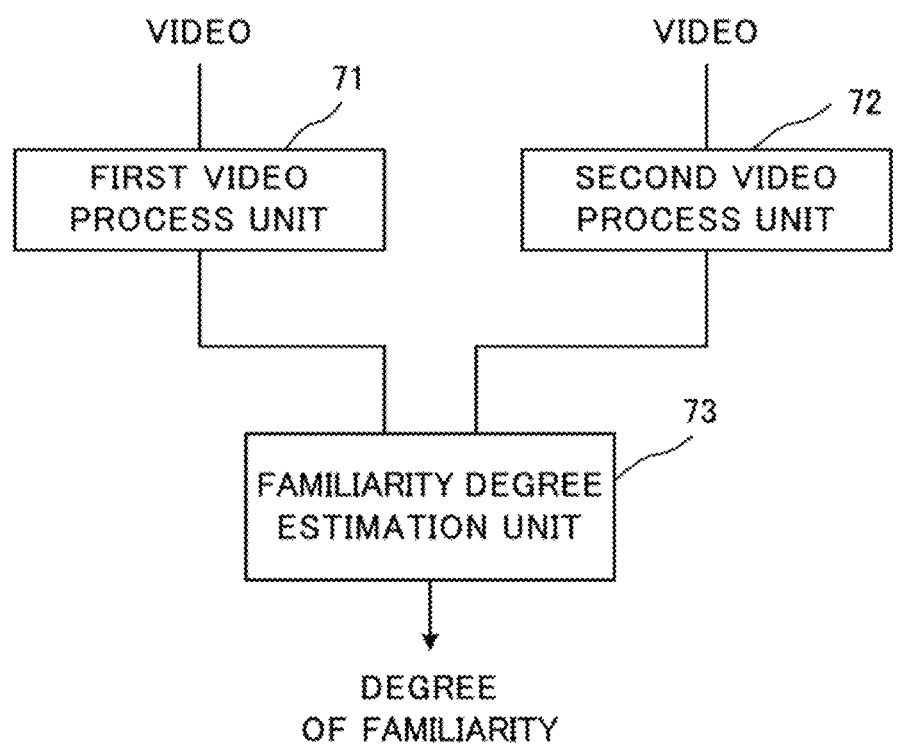
FIG. 10 is a block diagram illustrating a functional configuration of a familiarity degree estimation apparatus according to a second example embodiment.

Next, a second example embodiment of the present disclosure will be described. FIG. 10 is a block diagram illustrating a functional configuration of an familiarity degree estimation apparatus according to the second example embodiment. A familiarity degree estimation apparatus 70 includes a first video process unit 71, a second video process unit 72, and a familiarity degree estimation unit 73.

The first video process unit 71 calculates a time while a hand is being viewed, which is a time when a customer is viewing the hand, based on a video including a face of the customer. The second video process unit 72 calculates a time while an item is being held, which is a time when the customer is holding the item, based on a video including the hand of the customer. The familiarity degree estimation unit 73 estimates the degree of familiarity of the customer with respect to the item based on the time while the hand is being viewed and the time while the item is being held.

A part or all of the example embodiments described above may also be described as the following supplementary notes, but not limited thereto.

(Supplementary Note 1)

1. A familiarity degree estimation apparatus comprising:
   a first video process unit configured to calculate a time while a hand is being viewed when a customer is viewing the hand, based on a video including a face of the customer;
   a second video process unit configured to calculate a time while an item is being held when the customer is holding the item, based on a video including the hand of the customer; and
   a familiarity degree estimation unit configured to estimate a degree of familiarity of the customer with respect to the item based on the time while the hand is being viewed and the time while the item is being held.

(Supplementary Note 2)

2. The familiarity degree estimation apparatus according to supplementary note 1, wherein
   the second video process unit recognizes the item in the video including the hand of the customer; and
   the familiarity degree estimation unit stores the degree of familiarity by associating with the recognized item.

(Supplementary Note 3)

3. The familiarity degree estimation apparatus according to supplementary note 1 or 2, wherein the familiarity degree estimation unit calculates a time while the item is being viewed when the customer is viewing the item, based on the time while the hand is being viewed and the time while the item is being held, and estimates the degree of familiarity based on the time while the item is being viewed.

(Supplementary Note 4)

4. The familiarity degree estimation apparatus according to supplementary note 3, wherein the familiarity degree estimation unit estimates that the longer the time while the item is being viewed, the lower the degree of familiarity, and the shorter the time while the item is being viewed the higher the degree of familiarity.

(Supplementary Note 5)

5. The familiarity degree estimation apparatus according to supplementary note 4, wherein the familiarity degree estimation unit calculates a reciprocal of the time while the item is being viewed as the degree of familiarity.

(Supplementary Note 6)

6. The familiarity degree estimation apparatus according to any one of supplementary notes 1 through 5, wherein
   at least one of the first video process unit and the second video process unit determines attributes of the customer based on captured images being input; and
   the familiarity degree estimation unit classifies the degree of familiarity for each of the attributes of the customer.

(Supplementary Note 7)

7. The familiarity degree estimation apparatus according to any one of supplementary notes 1 through 6, wherein the familiarity degree estimation unit acquires information of whether or not the customer purchased the item, classifies the information into either of a case where the customer purchased and a case where the customer did not purchase, and stores the degree of familiarity.

(Supplementary Note 8)

8. A familiarity degree estimation method, comprising:
calculating a time while a hand is being viewed when a customer is viewing the hand, based on a video including a face of the customer;
calculating a time while an item is being held when the customer is holding the item, based on a video including the hand of the customer; and
estimating a degree of familiarity of the customer with respect to the item based on the time while the hand is being viewed and the time while the item is being held.

(Supplementary Note 9)

9. A recording medium storing a program, the program causing a computer to perform a process comprising:
calculating a time while a hand is being viewed when a customer is viewing the hand, based on a video including a face of the customer;
calculating a time while an item is being held when the customer is holding the item, based on a video including the hand of the customer; and
estimating a degree of familiarity of the customer with respect to the item based on the time while the hand is being viewed and the time while the item is being held.

While the disclosure has been described with reference to the example embodiments and examples, the disclosure is not limited to the above example embodiments and examples. Various modifications that can be understood by those skilled in the art can be made to the structure and details of the present invention within the scope of the present invention.

DESCRIPTION OF SYMBOLS

1 Item shelf
2 Camera for a line of sight
3R, 3L Camera for items
10 Server
21, 23 Video process unit
24 Item image storage unit
26 Familiarity degree estimation unit
27 Familiarity degree storage unit
28 Output unit

What is claimed is:

1. A system comprising:
a line-of-sight camera disposed above an item shelf and configured to capture a video of a customer in front of the item shelf, including a face of the customer;
a first item camera disposed on a left portion of the item shelf and including a first illumination unit at a bottom of the item shelf, the first item camera and configured to capture a video of the item shelf in an upper right direction while the first illumination unit is illuminating the item shelf in the upper right direction, the video including a hand of the customer taking or putting back an item from the item shelf;
a second item camera disposed on a right portion of the item shelf and including a second illumination unit at a top of the item shelf, the second item camera and configured to capture a video of the item shelf in a lower left direction while the second illumination unit is illuminating the item shelf in the lower left direction, the video including the hand of the customer taking or putting back the item from the item shelf, wherein the second item camera is vertically higher than the first item camera;
a memory storing instructions; and
one or more processors configured to execute the instructions to:
calculate a time while a hand is being viewed when a customer is viewing the hand, based on the video of the customer captured by line-of-sight camera;
calculate a time while an item is being held when the customer is holding the item, based on the videos of the item shelf captured by the first and second item cameras; and
estimate a degree of familiarity of the customer with respect to the item based on the time while the hand is being viewed and the time while the item is being held,
wherein disposition of the first and second item cameras on the left and right portions of the item shelf, respectively, where the second item camera is vertically higher than the first item camera, ensures that the item is included in the video captured by one of the first and second item cameras includes the item even when the item is hidden by the hand of the customer in the video captured by another of the first and second item cameras.

2. The system according to claim 1, wherein
the one or more processors recognize the item in the video including the hand of the customer when calculating the time while the item is being held; and
the one or more processors stores the degree of familiarity in association with the recognized item.

3. The system according to claim 1, wherein the one or more processors calculate a time while the item is being viewed when the customer is viewing the item, based on the time while the hand is being viewed and the time while the item is being held, and estimate the degree of familiarity based on the time while the item is being viewed.

4. The system according to claim 3, wherein the one or more processors estimate that the longer the time while the item is being viewed, the lower the degree of familiarity, and the shorter the time while the item is being viewed, the higher the degree of familiarity.

5. The system according to claim 4, wherein the one or more processors calculate a reciprocal of the time while the item is being viewed as the degree of familiarity.

6. The system apparatus according to claim 1, wherein
the one or more processors determine attributes of the customer based on captured images being input, when at least one of calculating the time while the hand is being viewed and calculating the time while the item is being held; and
the one or more processors classifies the degree of familiarity for each of the attributes of the customer.

7. The system according to claim 1, wherein the one or more processors acquire information of whether or not the customer purchased the item, classifies the information into either a case where the customer purchased the item and a case where the customer did not purchase the item, and store the degree of familiarity.

8. A familiarity degree estimation method performed by a system and comprising:
capturing, by a line-of-sight camera of the system and disposed above an item shelf, a video of a customer in front of the item shelf, including a face of the customer;
capturing, by a first item camera of the system disposed on a left portion of the item shelf and including a first illumination unit at a bottom of the item shelf, a video of the item shelf in an upper right direction while the first illumination unit is illuminating the item shelf in the upper right direction, the video including a hand of the customer taking or putting back an item from the item shelf;

capturing, by a second item camera disposed on a right portion of the item shelf and including a second illumination unit at a top of the item shelf, a video of the item shelf in a lower left direction while the second illumination unit is illuminating the item shelf in the lower left direction, the video including the hand of the customer taking or putting back the item from the item shelf, wherein the second item camera is vertically higher than the first item camera;

calculating, by one or more processors of the system, a time while a hand is being viewed when a customer is viewing the hand, based on the video of the customer captured by line-of-sight camera;

calculating, by one or more processors of the system, a time while an item is being held when the customer is holding the item, based on the videos of the item shelf captured by the first and second item cameras; and estimating, by one or more processors of the system, a degree of familiarity of the customer with respect to the item based on the time while the hand is being viewed and the time while the item is being held, wherein disposition of the first and second item cameras on the left and right portions of the item shelf, respectively, where the second item camera is vertically higher than the first item camera, ensures that the item is included in the video captured by one of the first and second item cameras includes the item even when the item is hidden by the hand of the customer in the video captured by another of the first and second item cameras.

9. A non-transitory computer-readable recording medium storing a program executable by one or more processors of a system to perform processing, wherein: the system includes a line-of-sight camera disposed above an item shelf and configured to capture a video of a customer in front of the item shelf, including a face of the customer, the system includes a first item camera disposed on a left portion of the item shelf and including a first illumination unit at a bottom of the item shelf, the first item camera and configured to capture a video of the item shelf in an upper right direction while the first illumination unit is illuminating the item shelf in the upper right direction, the video including a hand of the customer taking or putting back an item from the item shelf, the system includes a second item camera disposed on a right portion of the item shelf and including a second illumination unit at a top of the item shelf, the second item camera and configured to capture a video of the item shelf in a lower left direction while the second illumination unit is illuminating the item shelf in the lower left direction, the video including the hand of the customer taking or putting back the item from the item shelf, wherein the second item camera is vertically higher than the first item camera, and the processing comprises:

calculating a time while a hand is being viewed when a customer is viewing the hand, based on the video of the customer captured by the light-of-sight line-of-sight camera;

calculating a time while an item is being held when the customer is holding the item, based on the videos of the item shelf captured by the first and second item cameras; and estimating a degree of familiarity of the customer with respect to the item based on the time while the hand is being viewed and the time while the item is being held, wherein disposition of the first and second item cameras on the left and right portions of the item shelf, respectively, where the second item camera is vertically higher than the first item camera, ensures that the item is included in the video captured by one of the first and second item cameras includes the item even when the item is hidden by the hand of the customer in the video captured by another of the first and second item cameras.

* * * * *